May 1, 1951     H. D. JUSTICE     2,551,135
COIL WINDING TOOL
Filed June 25, 1949
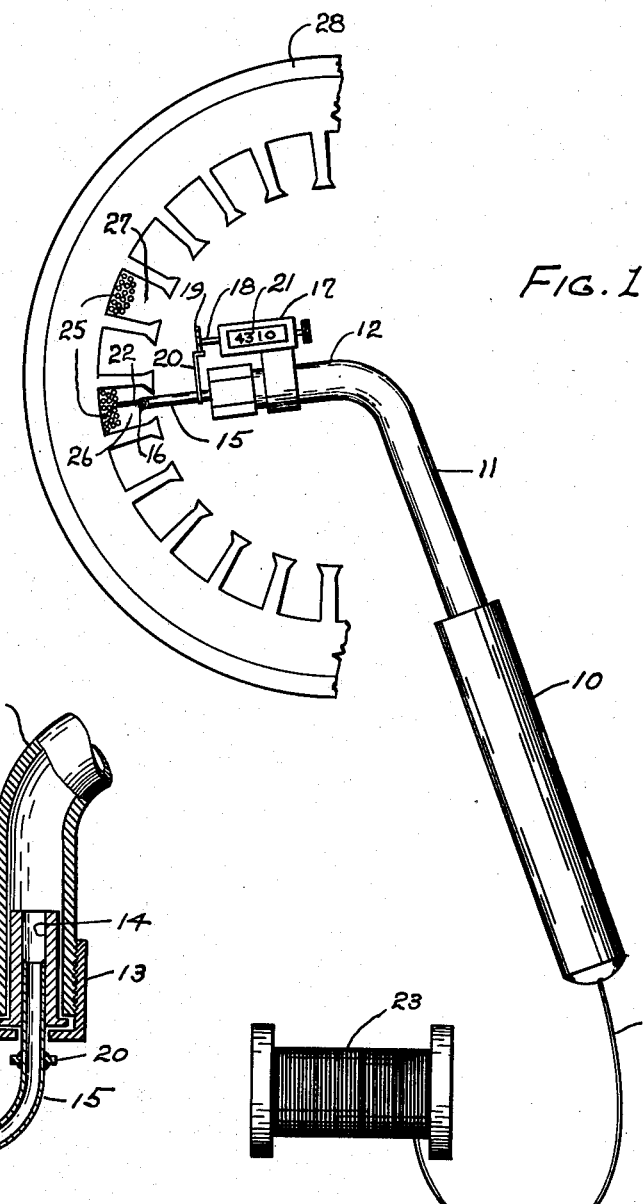
INVENTOR.
HAROLD D. JUSTICE
BY
Robert T. Palmer Patented May 1, 1951

2,551,135

UNITED STATES PATENT OFFICE 2,551,135

COIL WINDING TOOL

Harold D. Justice, Iowa City, Iowa

Application June 25, 1949, Serial No. 101,299

6 Claims. (Cl. 242—140)

This invention relates to tools for manually winding electrical coils.

Automatically operated coil winding machines are unsuited for the winding of certain types of coils such as field coils on the stators of electric motors, and such coils are usually wound, especially in small shops in which rewinding is done, by hand.

This invention provides a manually operated, coil winding tool which enables coils to be wound more quickly, less expensively, and more accurately than previously accomplished by winding by hand. In one embodiment of the invention the tool is a tube through which the wire to be wound is threaded and which has a straight, hand holding portion with a wire applying end bent at an obtuse angle thereto. The wire applying end has a smaller tube journalled therein and which is bent through a right angle. A revolution counter for counting the number of turns of the wire which is wound, is attached to the tool, and is operated by a lever attached to the smaller tube. The small tube rotates as the wire is wound, and operates the revolution counter.

Objects of the invention are to provide a manually operated coil winding tool which can be used to increase the speed and accuracy of, and to decrease the cost of, winding coils such as the field coils of electric motors on the stators thereof.

The invention will now be described with reference to the drawing, of which:

Fig. 1 is a view of a portion of a stator of an electric motor with a tool embodying this invention shown in position for winding a field coil thereon, and Fig. 2 is an enlarged view in cross-section of the wire-applying end of the tool.

The tool illustrated comprises a hollow tube having an enlarged hand held portion 10 with a smaller portion 11 extending therefrom and having its outer portion 12 bent through an obtuse angle. The outer end of the tube portion 12 is threaded to receive the nut 13 which rotably supports the fitting 14 to which the inner end of the small tube 15 is attached. The tube 15 is bent through such an angle that the axis of its outer end 16 is perpendicular to the axis of its inner end.

The revolution counter 17 is attached to the tube 11 and has a shaft 18 with a gear 19 thereon, extending parallel the axis of the fitting 14. The tube 15 has a lever 20 attached thereto perpendicular to the axis of the fitting 14 and which engages the gear 19 whereby each revolution on the tube 15 causes rotation of the gear 19 which causes the counter 17 to record the number of turns of the coil which has been wound.

The wire 22 from the reel 23 is threaded through the tubes 11 and 15, and emerges from the outer end 16 of the tube 15 as illustrated by Fig. 1.

In operation, assuming the coil 25 is to be wound in the coil spaces 26 and 27 of the stator 28 illustrated by Fig. 1 of the drawing, the tool is positioned as illustrated by Fig. 1, so that the outer end 16 of the tube 15 is in the space 26. The outer end of the tool is then rotated successively past the coil receiving spaces 26 and 27 with the outer end of the tube 15 first in one, and then in the other, of the spaces. The drag of the wire causes the fitting 14 and the tube 15 to rotate in the outer end of the tool. Each rotation of the tube 15 corresponds to one turn wound on the coil 25 so that the number of turns is recorded by the scale 21 of the counter 17.

It will be observed that in the use of the tool the wire is not touched by hand once the winding has started. The tool portion 10 which is grasped in an operator's hand is shaped to be comfortably held there. Coils are wound more quickly and accurately and therefore less expensively than in the manual method used in the past in which the wire was guided by hand through the coil receiving spaces. The provision of the revolution counter insures that the correct number of turns is wound on each coil.

While one embodiment of the invention has been described for the purpose of illustration, it should be understood that the invention is not limited to the exact apparatus and arrangement of apparatus illustrated, since modifications thereof may be suggested by those skilled in the art, without departure from the essence of the invention.

What is claimed is:

1. A coil winding tool comprising a tube having a wire-receiving passage therein, said tube having a hand grasping portion, and having an outer end bent at an angle thereto, and a smaller tube having a wire-receiving passage therein, and having an inner end rotatably mounted to said outer end, and having its outer end bent at an angle to said inner end, said smaller tube being rotatable about its axis at said inner end.

2. A coil winding tool as claimed in claim 1 in which a revolution counter is attached to the outer end of the first mentioned tube, and in which means is provided for operating the counter through the rotation of the smaller tube.

3. A coil winding tool as claimed in claim 1 in which the outer end of the first mentioned tube is bent through an obtuse angle.

4. A coil winding tool as claimed in claim 1 in which the outer end of the smaller tube is bent substantially perpendicular to its inner end.

5. A coil winding tool as claimed in claim 1 in which the outer end of the first mentioned tube is bent through an obtuse angle, and in which the outer end of the smaller tube is bent through an angle substantially perpendicular to its inner end.

6. A coil winding tool as claimed in claim 5 in which a revolution counter is attached to the outer end of the first mentioned tube, and in which means is provided for operating the counter through rotation of the smaller tube.

HAROLD D. JUSTICE.

REFERENCES CITED

The following references are of record in the file of this patent:

UNITED STATES PATENTS

| Number | Name | Date |
| --- | --- | --- |
| 889,265 | Smith | June 2, 1908 |
| 1,579,695 | Ford | Apr. 6, 1926 |
| 2,474,463 | Burrell | June 28, 1949 |

FOREIGN PATENTS

| Number | Country | Date |
| --- | --- | --- |
| 40,596 | France | Apr. 26, 1932 |